United States Patent
Hidaka et al.

(10) Patent No.: US 11,078,961 B2
(45) Date of Patent: Aug. 3, 2021

(54) INTERMEDIARY RACE MEMBER OF ROLLING BEARING, RACE, ROLLING BEARING AND PRODUCTION METHOD THEREFOR

(71) Applicant: NSK LTD., Tokyo (JP)

(72) Inventors: Hideyuki Hidaka, Fujisawa (JP); Riichiro Matoba, Fujisawa (JP); Yuji Miyamoto, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/976,266

(22) PCT Filed: Jun. 15, 2018

(86) PCT No.: PCT/JP2018/023033
§ 371 (c)(1),
(2) Date: Aug. 27, 2020

(87) PCT Pub. No.: WO2019/193772
PCT Pub. Date: Oct. 10, 2019

(65) Prior Publication Data
US 2020/0408262 A1   Dec. 31, 2020

(30) Foreign Application Priority Data

Apr. 2, 2018 (JP) ............................. JP2018-070943
Apr. 13, 2018 (JP) ............................. JP2018-077598

(51) Int. Cl.
*C21D 9/40* (2006.01)
*F16C 33/64* (2006.01)

(52) U.S. Cl.
CPC ................ *F16C 33/64* (2013.01); *C21D 9/40* (2013.01); *F16C 2204/64* (2013.01);
(Continued)

(58) Field of Classification Search
CPC .. F16C 33/64; F16C 2204/64; F16C 2220/82; F16C 2223/06; F16C 2223/16; F16C 2240/18; C21D 9/40
(Continued)

(56) References Cited

U.S. PATENT DOCUMENTS 1,482,563 A * 2/1924 Hultgren .................. C21D 7/04
148/650
4,191,599 A   3/1980 Stickels et al.
(Continued)

FOREIGN PATENT DOCUMENTS

CN   102747306 A   10/2012
CN   103890201 A    6/2014
(Continued)

OTHER PUBLICATIONS

Japanese Office Action dated Feb. 19, 2019 in Japanese Patent Application No. 2019-502823.
(Continued)

Primary Examiner — Marcus Charles
(74) Attorney, Agent, or Firm — Sughrue Mion, PLLC (57) ABSTRACT

A method for manufacturing a bearing ring of a rolling bearing includes a series of steps of cutting out an annular member from a material, forming a surface-hardened layer on the annular member, quenching and tempering the annular member, and polishing inner and outer diameter surfaces of the annular member. The method includes, after the quenching, rapidly cooling the ring member such that the ring member has a surface temperature of 50° C. or lower to form a bearing ring intermediate member, and after the tempering, polishing inner and outer diameter surfaces of the bearing ring intermediate member.

3 Claims, 4 Drawing Sheets (52) U.S. Cl.
CPC ...... *F16C 2220/82* (2013.01); *F16C 2223/06* (2013.01); *F16C 2223/16* (2013.01); *F16C 2240/18* (2013.01)

(58) Field of Classification Search
USPC .............. 384/624–625; 29/898.06, 898.063, 29/898.066, 898.13
See application file for complete search history.

(56) References Cited

U.S. PATENT DOCUMENTS

| | | | |
|---|---|---|---|
| 4,871,268 A | | 10/1989 | Furumura et al. |
| 5,603,576 A | * | 2/1997 | Hirakawa ................ C21D 7/04 384/491 |
| 6,119,347 A | * | 9/2000 | Hirakawa ................ C21D 7/04 148/906 |
| 6,537,390 B1 | | 3/2003 | Goto |
| 9,732,394 B2 | | 8/2017 | Chin et al. |
| 2003/0093903 A1 | * | 5/2003 | Obara ..................... F16C 19/06 29/898.06 |
| 2004/0091194 A1 | | 5/2004 | Toda et al. |
| 2008/0047632 A1 | | 2/2008 | Trojahn et al. |
| 2008/0053578 A1 | * | 3/2008 | Maeda ..................... F16C 19/30 148/559 |
| 2014/0305552 A1 | | 10/2014 | Ohki |
| 2016/0032976 A1 | | 2/2016 | Chin et al. |
| 2016/0114438 A1 | * | 4/2016 | Yamamoto .............. B21J 1/003 384/513 |

FOREIGN PATENT DOCUMENTS

| | | | | |
|---|---|---|---|---|
| CN | 105264248 A | * | 1/2016 | ............ F16C 33/62 |
| CN | 106661481 A | * | 5/2017 | .......... C10M 125/26 |
| CN | 107530778 A | * | 1/2018 | .............. C21D 9/38 |
| EP | 1 418 246 A1 | | 5/2004 | |
| EP | 2 226 405 A1 | | 9/2010 | |
| EP | 2 386 669 A1 | | 11/2011 | |
| EP | 2 514 844 A2 | | 10/2012 | |
| JP | 63-303222 A | | 12/1988 | |
| JP | 2001-200851 A | | 7/2001 | |
| JP | 2004-150527 A | | 5/2004 | |
| JP | 2008-520839 A | | 6/2008 | |
| JP | 2008-196033 A | | 8/2008 | |
| JP | 2009-41652 A | | 2/2009 | |
| JP | 2013253631 A | * | 12/2013 | ............ F16C 33/585 |
| JP | 2014-20538 A | | 2/2014 | |
| JP | 5598016 B2 | * | 10/2014 | ............. F16C 33/62 |
| JP | 2015105667 A | * | 6/2015 | ............. F16C 19/06 |
| JP | 2015212404 A | * | 11/2015 | .............. C21D 9/40 |
| JP | 5895360 B2 | * | 3/2016 | ............. F16C 33/64 |
| JP | 2016125652 A | * | 7/2016 | ............. B21D 53/10 |
| JP | WO2015128973 A1 | * | 3/2017 | .......... C10M 105/18 |
| JP | 2017122510 A | * | 7/2017 | ............. F16C 19/08 |
| KR | 19990073324 A | * | 10/1999 | .............. C21D 9/40 |
| WO | WO-2015141807 A1 | * | 9/2015 | .......... F16C 33/7856 |
| WO | WO-2015147067 A1 | * | 10/2015 | ............. C22C 38/28 |
| WO | WO-2017126323 A1 | * | 7/2017 | ............. F16C 33/32 |
| WO | WO-2017175756 A1 | * | 10/2017 | .............. C21D 1/667 |
| WO | WO-2018012626 A1 | * | 1/2018 | ............... C21D 1/18 |

OTHER PUBLICATIONS

International Search Report dated Aug. 28, 2018 (PCT/ISA/210) issued by the International Searching Authority for International Application No. PCT/JP2018/023033.
Written Opinion dated Aug. 28, 2018 (PCT/ISA/237) issued by the International Searching Authority for International Application No. PCT/JP2018/023033.
Decision to Grant a Patent dated Jun. 18, 2019 in Japanese Patent Application No. 2019-502823 (Date of Grant: Aug. 2, 2019).
Office Action dated Apr. 28, 2021, issued by the State Intellectual Property Office of P.R. China in counterpart Chinese Application No. 201880092126.2.
Bingquan Wen, "Foundation of Mechanical Manufacturing," Beijing Institute of Technology Press, Jan. 2017, Total 24 pages.
Extended European Search Report dated Apr. 29, 2021, issued by the European Patent Office in counterpart European patent Application No. 18913450.5.

\* cited by examiner

INTERMEDIARY RACE MEMBER OF ROLLING BEARING, RACE, ROLLING BEARING AND PRODUCTION METHOD THEREFOR

CROSS-REFERENCE TO RELATED APPLICATIONS

This application is a National Phase Entry of PCT International Application No. PCT/JP2018/023033, filed on Jun. 15, 2018, which claims priority to Japanese Patent Application No. 2018-070943 filed on Apr. 2, 2018 and Japanese Patent Application No. 2018-077598 filed on Apr. 13, 2018.

TECHNICAL FIELD

The present invention relates to a bearing ring intermediate member for a rolling bearing, and more specifically, defines a surface layer state of a material (that is, "bearing ring intermediate member") immediately before a polishing step after heat treatment in a step for manufacturing a bearing ring. The present invention also relates to the bearing ring obtained from the bearing ring intermediate member, and further to the rolling bearing including the bearing ring. Further, the present invention relates to a method for manufacturing the bearing ring for the rolling bearing and a method for manufacturing the rolling bearing, and more specifically relates to a technique for manufacturing a high-accuracy rolling bearing by devising the heat treatment to control a distribution of residual stress, and suppressing a reduction in the roundness of the bearing ring obtained after polishing.

BACKGROUND ART

In recent years, cylindrical roller bearings and needle roller bearings are required to be reduced in size and weight depending on applications. Accordingly, there is a demand for not only reducing the size of the bearing but also reducing the thickness of the inner and outer rings thereof. Examples include an automobile transmission, a computer tomography machine (CT scanner), or the like. In a related art, a lack of durability due to reduction in thickness and size is compensated by hardening a surface of a bearing ring. For example, in a bearing for a transmission in Patent Literature 1, carburizing or carbonitriding is performed to increase the amount of retained austenite on a bearing ring surface in order to extend the life of the bearing even in a lubricating environment in which a foreign matter is mixed.

Figure 1:
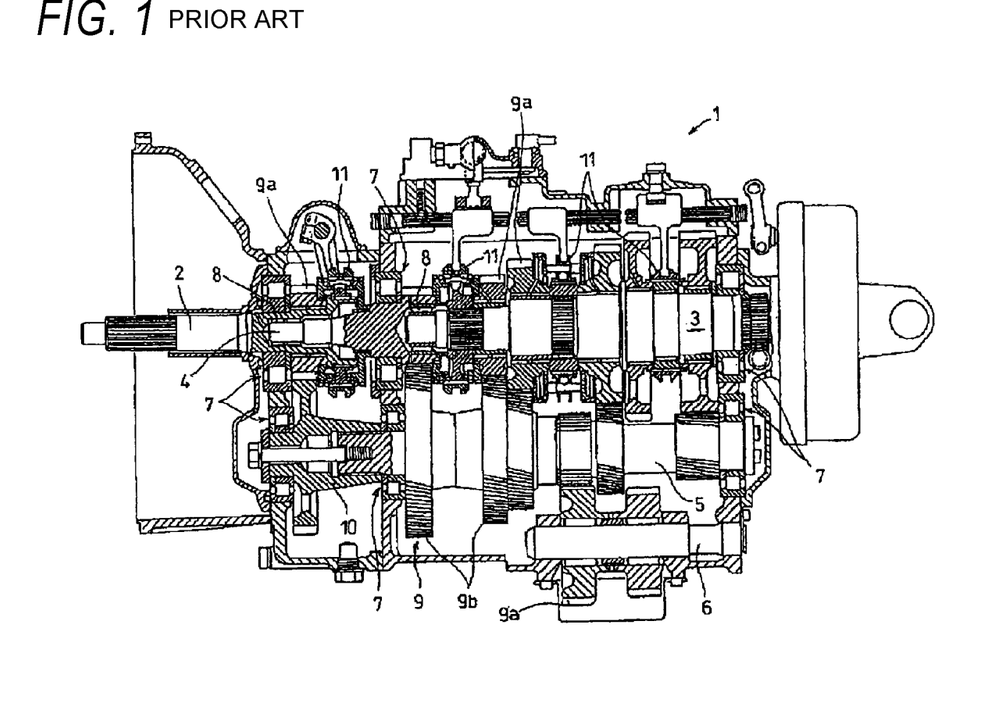
FIG. 1 is a sectional view showing an example of a vehicle transmission.

FIG. 1 is a sectional view showing an example of a vehicle transmission. This transmission is a manual type. An input shaft 2, an output shaft 3, and a pilot shaft 4 as an intermediate shaft are arranged in series in a housing 1. A counter shaft 5 as an intermediate shaft and a reverse shaft 6 are arranged in parallel with the output shaft 3.

The shafts 2, 3, 5 and the pilot shaft 4 except the reverse shaft 6 are rotatably supported by a cylindrical roller bearing 7 and a needle roller bearing 8, and a large number of gear groups 9 are attached to the shafts 2, 3, 5, 6. A gear member 10 having one end supported by the cylindrical roller bearing 7 is also attached to the counter shaft 5.

Gears 9a of the input shaft 2, the output shaft 3, and the reverse shaft 6 are rotatably attached to the shafts 2, 3 and 6 respectively, and these rotatable gears 9a and the pilot shaft 4 are meshed with any one of gears 9b or the gear member 10 of the counter shaft 5. The rotation of these gears 9a is selectively synchronized with each other in the respective attached shafts 2, 3 and 6 by a clutch hub 11 which is shifted by an operation from the outside, and a torque transmission path from the input shaft 2 to the output shaft 3 is appropriately selected.

The inner and outer rings of the cylindrical roller bearing 7 and the needle roller bearing 8 are strengthened by carburizing or carbonitriding treatment to reduce the thickness.

CITATION LIST

Patent Literature

Patent Literature 1: JP-A-2001-200851

SUMMARY OF INVENTION

Problems to be Solved

In a rolling bearing, since each member is required to have high hardness, quenching treatment is required, and elliptical deformation due to the quenching treatment is inevitable. Further, in a bearing ring that has been subjected to surface hardening treatment by carburizing or carbonitriding, quenching after the treatment and subsequent re-quenching for adjusting a structure are often performed, which promotes the elliptical deformation. In order to reduce size and weight, the amount of deformation increases as the thickness is reduced. For this reason, correction work may be added, but the correction work is reflected in manufacturing cost.

Further, the rolling bearing is a mechanical component used for maintaining smooth rotation, and is subjected to polishing processing after heat treatment so as to be close to a perfect round shape. A degree of roundness required at this time needs to be controlled at a micron level, but the bearing ring may be distorted during the polishing processing, and sufficient rotational accuracy may not be ensured. As a countermeasure, polishing is repeatedly performed to achieve a required dimensional accuracy. However, a burden on the polishing step increases and productivity decreases, which is reflected in the manufacturing cost.

If the roundness is not sufficient, the rotation accuracy of the bearing will deteriorate, which will greatly affect fuel economy of the automobile, so that the elliptical deformation due to the heat treatment and a reduction in roundness in the polishing step are serious problems for the rolling bearing for a transmission. Specifically, when the roundness of the cylindrical roller bearing 7 or the needle roller bearing 8 supporting the input shaft 2 or the output shaft 3 is low, the input shaft 2 and the output shaft 3 are eccentric and the clutch hub 11 does not mesh well with the gears 9a and 9b, or metal powder is generated, thus causing torque loss of the whole transmission. As a result, the fuel economy of the automobile is deteriorated. In order to adjust the roundness of the bearing, a spacer may be interposed between the bearing and the shaft, but an adjustment work is required additionally.

Accordingly, an object of the present invention is to provide a bearing ring intermediate member for preventing a reduction in the roundness of a bearing ring in a polishing step such that a rolling bearing excellent in rotational accuracy can be efficiently obtained. Another object of the present invention is to provide a method capable of preventing a reduction in the roundness of the bearing ring obtained after polishing. Further, the present invention provides the bearing ring having a high roundness, and the rolling bearing including the bearing ring having the high roundness and excellent in rotational performance.

As a result of intensive studies on the reduction of the roundness, the inventors obtained the following knowledge.

For example, generally, in a method for manufacturing an outer ring, a raceway surface on an inner diameter side is polished after an outer diameter side is polished in a polishing step. The amount of the elliptic deformation by the heat treatment varies depending on each bearing ring. For example, the amount of the elliptic deformation by the heat treatment is about several hundred microns in a bearing used in an automobile transmission. Such a bearing ring is polished to an appropriate roundness (about 10 microns in this case), but at this time, stock allowance in the polishing step is non-uniform due to the elliptic deformation on the outer diameter side and the inner diameter side. In the polishing on the outer diameter side, an appropriate roundness can be obtained by ordinary processing. However, if the inner diameter side is subsequently polished in a similar way, the roundness on the adjusted outer diameter side may become poor, and the above-described appropriate range may be exceeded. This phenomenon is due to the release of residual stress, and is caused by non-uniformly removing a part where residual stress is present. To be precise, this phenomenon also occurs on the inner diameter side when the outer diameter side is polished, but the deformation amount is as small as about 1/10 of the deformation amount due to the heat treatment and is not a problem because polishing is performed thereafter.

Therefore, as a solution, a method of making the stock allowance uniform by correcting the deformation at the time of heat treatment as described above, and a method of controlling the residual stress in the stock allowance to be small even the stock allowance is non-uniform are considered. That is, in order to suppress the deformation during polishing, it can be said that it is effective to reduce the residual stress (close to 0) in the stock allowance.

The distortion of the bearing ring by the polishing processing is determined by the stress caused by the non-uniform release of the residual stress and a resistance to the deformation of the bearing ring, that is, rigidity. Stress is expressed as a function of a difference of the non-uniform stock allowance and the residual stress. Since the non-uniformity of the stock allowance is determined by the deformation amount due to the heat treatment, a stress value generated by polishing can be calculated if the deformation amount at the time of heat treatment, a depth, and an average value of the residual stress in the stock allowance are known. The deformation resistance, that is, rigidity of the bearing ring is determined by the shape of the member, the Young's modulus of the material, the diameter and thickness of the outer ring. From the above theory, when the basic shape of the ring is set and a target roundness and the amount of the part (stock allowance) removed by the polishing processing are determined, the value of the target residual stress can be calculated from the law of spring law (Hooke's law).

On the other hand, the residual stress is a stress caused by non-uniform distortion in the component, and the causes are various, such as heat treatment, machining, and unevenness of components. Such non-uniformity is not limited to circumferential non-uniformity. For example, since carburizing or carbonitriding described above causes carbon or nitrogen to enter from the surface of the member, a carburized layer and a non-carburized layer (core portion) are in a non-uniform state in a cross section (depth direction) of the member, and thus, residual stress is generated. It is generally known that after quenching, a compressive residual stress is generated in the carburized layer. In addition, when the stress is generated, the component is deformed, but a fact that the deformation is stopped means that a stress that cancels out the generated stress naturally occurs. In the case of carburizing described above, it is known that the core portion plays a role of canceling out the stress of the carburized layer. In most components, since the core portion has a wide volume compared to the carburized layer, the residual stress in the entire part is cancelled out, and the residual stress of the core portion is generally 0, specifically 0 to +100 MPa or less. The residual stress of a general carburized layer is about −300 MPa, and exhibits a behavior that apparently decreases (approaches 0) from the surface to an inside. In the present invention described below, the residual stress generated in such a carburized layer is reduced by means of a heat treatment condition. As described above, the residual stress of the core portion is also 0 to +100 MPa or less. Therefore, in the present invention, even if the carburized layer has a depth similar to that of a related-art component, by controlling the heat treatment condition, the compressive residual stress generated in the carburized layer can be reduced, so that compared to the related-art component, the gradient of the residual stress in the direction of the core portion can be clearly made gentler. Specifically, although the residual stress generated in the carburized layer is in the compression range, it has been successfully reduced by half, and the gradient is clearly gentler.

The present invention is based on such findings, and provides a bearing ring intermediate member, and a bearing ring for a rolling bearing, the rolling bearing, and methods for manufacturing the bearing ring and the rolling bearing to-be-described below.

(1) A bearing ring intermediate member for a rolling bearing, the bearing ring intermediate member being in a state after heat treatment and before polishing, wherein the bearing ring intermediate member includes a surface-hardened layer, and in the bearing ring intermediate member, a gradient of a residual stress from a surface to a core portion is gentle.

(2) The bearing ring intermediate member for the rolling bearing according to (1), wherein an absolute value of an average residual stress in each part from the surface to the core portion in a radial direction is 0 to 191 MPa.

(3) The bearing ring intermediate member for the rolling bearing according to (2), wherein the absolute value of the average residual stress in each part from the surface to the core portion in the radial direction is 0 to 111 MPa.

(4) The bearing ring intermediate member for the rolling bearing according to any one of (1) to (3), wherein the bearing ring intermediate member is made of case-hardened steel, and the surface-hardened layer is a carburized surface-hardened layer, a nitrided surface-hardened layer, or a carbonitrided surface-hardened layer.

(5) The bearing ring intermediate member for the rolling bearing according to any one of (1) to (4), wherein the bearing ring intermediate member for the rolling bearing is a bearing ring intermediate member for a tapered roller bearing or a ball bearing.

(6) A bearing ring intermediate member for a rolling bearing, the bearing ring intermediate member being in a state after heat treatment and before polishing, wherein the bearing ring intermediate member includes a surface-hardened layer, and in the bearing ring intermediate member, an absolute value of an average residual stress in each part from a surface to a core portion in a radial direction is 0 to 191 MPa.

(7) A bearing ring for a rolling bearing, wherein
the bearing ring is obtained from the bearing ring intermediate member for the rolling bearing according to any one of (1) to (6).

(8) A rolling bearing comprising the bearing ring according to (7).

(9) A method for manufacturing a bearing ring of a rolling bearing, the method comprising a series of steps of:
cutting out an annular member from a material;
forming a surface-hardened layer on the annular member;
quenching and tempering the annular member; and
polishing inner and outer diameter surfaces of the annular member, wherein the method comprises:
after the quenching, rapidly cooling the ring member such that the ring member has a surface temperature of 50° C. or lower to form a bearing ring intermediate member; and
after the tempering, polishing inner and outer diameter surfaces of the bearing ring intermediate member.

(10) The method for manufacturing the bearing ring of the rolling bearing according to (9), wherein
the rapid cooling is performed along with cleaning of the annular member with a cleaning liquid after the quenching.

(11) The method for manufacturing the bearing ring of the rolling bearing according to (9) or (10), wherein
in the bearing ring intermediate member before polishing, a gradient of a residual stress from a surface to a core portion is made gentle.

(12) The method for manufacturing the bearing ring of the rolling bearing according to any one of (9) to (11), wherein
an absolute value of an average residual stress of each part from a surface to a core portion in a radial direction is 0 to 191 MPa.

(13) A method for manufacturing a rolling bearing comprising the method for manufacturing the bearing ring according to any one of (9) to (12).

Advantageous Effects of Invention

In the bearing ring intermediate member of the present invention, a residual stress in the stock allowance of a polishing step in a depth direction from the surface to the core portion, specifically from a depth position of 50 μm to a depth position of 250 μm, is closer to 0 than the residual stress in a related-art product, and a change in the residual stress is made gentle toward the core portion which is the non-carburized layer to an extent that the residual stress is almost not changed. Since the residual stress of the core portion is substantially close to 0, the residual stress in the stock allowance by polishing is inevitably controlled to be low. As a result, after polishing the bearing ring intermediate member having a general elliptic deformation, a finished product of the bearing ring which is less likely to deform and has good roundness can be efficiently obtained.

The bearing ring of the present invention is obtained by polishing the inner diameter surface and the outer diameter surface of the bearing ring intermediate member, and the bearing ring having a high roundness is obtained because a decrease in roundness is suppressed during polishing. The rolling bearing including the bearing ring having the high roundness is excellent in rotational accuracy.

The residual stress is generally measured by an X-ray diffraction method. For example, a structure on an outermost surface after heat treatment such as carburization is formed with a compound formed by oxidation or the like and is not suitable for measurement in that state. Therefore, in order to detect an influence of the residual stress caused by the metal structure, the portion is generally removed by electrolytic polishing, and the value in the depth of 50 μm is evaluated to be equal to the outermost surface in consideration of the depth of the influence layer on the surface this time. Theoretically, it is a common sense in a bearing manufacturing industry that unless some intentional processing is performed, the residual stress does not substantially change in a region shallower than the depth of 50 μm, and the residual stress value is approximately a similar level.

DESCRIPTION OF EMBODIMENTS

Hereinafter, the present invention will be described in detail with reference to the drawings. In the following description, a bearing ring intermediate member of a rolling bearing is also simply referred to as "race ring intermediate member".

In the present invention, there is no restriction on the type of the rolling bearing. As the rolling bearing, a tapered roller bearing, a ball bearing, a cylindrical roller bearing, a needle roller bearing, or the like are generally used, and in the present invention, these rolling bearings and also the bearing rings (inner ring or outer ring) are targeted. In addition, when the bearing ring is thinned, t/D (t: effective thickness of bearing ring, D: outer diameter of bearing ring) being 0.1 or less is particularly effective.

In the present invention, first, an annular member made of a material to be an inner ring or an outer ring is prepared. The material is preferably case-hardened steel such that a surface-hardened layer can be easily formed by carburizing treatment, nitriding treatment, and carbonitriding treatment. In order to improve hardenability, Cr, Mn, or the like are preferably added as alloy components.

Then, similar to a related art, the annular member is used to form a surface-hardened layer, heat treatment of quenching and tempering is performed to form a bearing ring intermediate member, and then an inner diameter surface and an outer diameter surface of the bearing ring intermediate member are polished to manufacture a bearing ring. The quenching may be performed once or twice. The obtained bearing ring is assembled together with a rolling element and a cage to form a rolling bearing. This sequence of steps is similar to that of the related art.

However, in the present invention, the annular member is rapidly cooled after being quenched to form the bearing ring intermediate member, and then tempering and polishing are performed. In addition, after the annular member is quenched with oil for cooling, the annular member may also be rapidly cooled along with cleaning of the oil adhering to the annular member. As a rapidly cooling method, the annular member may be immersed in a storage tank of water or a cleaning liquid, but the annular member is not suitable for continuous processing because the liquid temperature rises, and thus a method of spraying water or the cleaning liquid onto the annular member is preferable. A refrigerant for rapidly cooling is particularly preferably water in consideration of cooling capacity, cost, ease of post-processing, and the like, and water can also be used for cleaning. A cleaning liquid obtained by adding a surfactant to water is preferable, and a rust inhibitor may be added.

Although it is known that a compressive residual stress is generated on a surface of the annular member formed with the surface-hardened layer, the compressive residual stress depends on the order of generation of martensitic transformation associated with a gradient of the carbon, and is generated by the martensitic transformation occurring in the order from a core portion to the surface along with cooling. Since the hardness of martensite depends on the amount of carbon, a hardness distribution and a residual stress distribution corresponding to the gradient of carbon concentration are generated from the surface to the inside. The hardness depends almost only on the carbon concentration, but the residual stress depends on the occurrence time of the martensitic transformation. Therefore, by rapidly cooling the surface at which the occurrence of the martensite transformation is later than the occurrence of the martensite transformation at the core portion, the occurrence timing of the martensitic transformation is synchronized between the surface and the core portion, and the occurrence of the residual stress can be suppressed.

For this purpose, a cooling rate of the surface of the annular member is made relatively higher than a cooling rate of the core portion by rapid cooling the annular member after quenching or by rapid cooling the annular member along with the cleaning. Specifically, it has been found that it is effective to perform rapid cooling after quenching, and set the surface temperature of the annular member to 50° C. or lower, preferably 10 to 40° C. By the rapid cooling, the residual stress on the surface of the bearing ring intermediate member and the distribution of the residual stress are controlled, so that a change in the residual stress in the stock allowance corresponding to the surface, that is in the depth direction from the depth position of 50 μm to the core portion is made gentle to an extent that the residual stress is almost not changed. More preferably, an absolute value of an average residual stress in the stock allowance is 0 to 191 MPa, and has a depth-residual stress distribution that gradually approaches 0 from the surface to the core portion. Further, the absolute value of the residual stress at the depth position of 50 μm to 250 μm corresponding to the inside of the stock allowance is set to 100 MPa or less. More preferably, the absolute value of the residual stress at the depth position of 50 μm to 250 μm corresponding to the inside of the stock allowance is set to 60 MPa or less. The cooling rate at the time of rapid cooling is 10° C./min or more, and more preferably 15° C./min or more.

Further, the residual stress distribution on the surface of the bearing ring intermediate member is preferably maintained as it is in the bearing ring which is a final product obtained by polishing. That is, even in the finally obtained bearing ring, the change in the residual stress from the depth position of 50 μm to the core portion is gentle to an extent that the residual stress is almost not changed, the absolute value of the average residual stress in the stock allowance is 0 to 191 MPa, there is a depth-residual stress distribution that gradually approaches zero from the surface to the core portion, and the absolute value of the residual stress at the depth position of 50 μm to 250 μm is preferably 100 MPa or less, more preferably 60 MPa or less.

Then, after tempering by a related-art method, the inner diameter surface and the outer diameter surface are polished to complete the bearing ring, but the residual stress on the surface of the bearing ring intermediate member is reduced by the rapid cooling after quenching or the cleaning and the rapid cooling after quenching as described above, so that the reduction in roundness at the time of polishing can be suppressed.

The above-described bearing ring can be assembled together with the rolling element and the cage to form the rolling bearing.

Roundness is generally standardized by JIS B 1515, and is a difference between a maximum value and a minimum value of an outer diameter in one radial plane, and JIS B 1514 defines roundness for each bearing outer diameter and each grade. The accuracy of roundness required for the diameter of the bearing ring is about 0.01 to 0.03%. Here, a case where the maximum value at Grade 0 of a general product is set as a minimum target value, a preferable target value is set as within 0.015% of the outer diameter, and a more preferable target value is set as within 0.01% of the outer diameter will be described.

In addition, in the polishing, the stock allowance is defined in JIS B 0711 in consideration of the surface property or the like of a heat-treated product. In the rolling bearing for a transmission according to the present invention, the stock allowance of the outer diameter is set as 0.2 mm in diameter.

Once the roundness and the stock allowance are determined, the residual stress required for obtaining the target roundness can be calculated within a range of the stock allowance.

The residual stress of the member can be determined from the curvature of the member, and in the present invention, the residual stress is determined based on a curvature method. That is, for the ring member made of case-hardened steel that is the material of the inner ring and outer ring, after the surface-hardened layer is formed, and the heat treatment of quenching and tempering are performed, dimensional changes of the outer and inner diameters are measured. From this amount of change, based on a definition expression of residual stress by the curvature method, the residual stress is calculated to achieve the target roundness for each outer diameter and thickness.

Tables 1 to 3 show results, and the average residual stress required to achieve the target roundness in the range of the stock allowance being 0.2 mm for each outer diameter and thickness of the annular member. Table 1 shows a case where the target roundness is within the maximum value of Grade 0 in JIS standard, Table 2 shows a case where the target roundness is within 0.015% of the outer diameter, and Table 3 shows a case where the target roundness is within 0.01% of the outer diameter. As shown in Tables 1 to 3, in any roundness, the residual stress decreases as the outer diameter increases when the thickness is the same; conversely, the residual stress increases as the thickness increases when the outer diameter is the same.

TABLE 1

| Thickness (mm) | Outer diameter of outer ring (mm) | | | | | | |
|---|---|---|---|---|---|---|---|
| | 50 | 60 | 70 | 80 | 90 | 100 | 120 |
| 3 | −76 | −53 | −39 | −34 | −27 | −22 | −15 |
| 4 | −181 | −125 | −92 | −81 | −64 | −51 | −36 |
| 5 | −331 | −230 | −168 | −148 | −117 | −95 | −66 |
| 6 | | −366 | −268 | −237 | −187 | −151 | −105 |
| 7 | | | −392 | −346 | −274 | −222 | −154 |
| 8 | | | | −477 | −377 | −305 | −212 |
| 9 | | | | | −496 | −402 | −280 |

TABLE 2

| Thickness (mm) | Outer diameter of outer ring (mm) | | | | | | |
|---|---|---|---|---|---|---|---|
| | 50 | 60 | 70 | 80 | 90 | 100 | 120 |
| 3 | −44 | −37 | −31 | −27 | −27 | −22 | −15 |
| 4 | −103 | −87 | −74 | −65 | −57 | −51 | −36 |
| 5 | −191 | −158 | −136 | −119 | −105 | −95 | −65 |
| 6 | −304 | −253 | −217 | −190 | −168 | −151 | −105 |
| 7 | −444 | −370 | −318 | −277 | −246 | −222 | −153 |
| 8 | | | −437 | −382 | −340 | −305 | −212 |
| 9 | | | | | −447 | −402 | −279 |

TABLE 3

| Thickness (mm) | Outer diameter of outer ring (mm) | | | | | | |
|---|---|---|---|---|---|---|---|
| | 50 | 60 | 70 | 80 | 90 | 100 | 120 |
| 3 | −29 | −25 | −21 | −18 | −16 | −15 | −12 |
| 4 | −69 | −58 | −50 | −43 | −38 | −35 | −29 |
| 5 | −127 | −105 | −91 | −79 | −70 | −63 | −53 |
| 6 | −202 | −168 | −145 | −126 | −112 | −100 | −84 |
| 7 | −296 | −246 | −211 | −185 | −164 | −147 | −123 |
| 8 | −407 | −340 | −291 | −254 | −225 | −203 | −169 |
| 9 | | −447 | −383 | −335 | −297 | −268 | −223 |

Then, a relationship between the outer diameter and the residual stress was graphed for each thickness from the same table, an approximate straight line was determined by a least square method, and a slope and an intercept were determined. Table 4 shows a case where the roundness is within the maximum value of Grade 0 in JIS standard, Table 5 shows a case where the roundness is within 0.015% of the outer diameter, and Table 6 shows a case where the roundness is within 0.01% of the outer diameter.

TABLE 4

| Thickness (mm) | Slope | Intercept |
|---|---|---|
| 3 | 0.8 | −103 |
| 4 | 1.91 | −245 |
| 5 | 3.49 | −449 |
| 6 | 4.14 | −578 |
| 7 | 4.89 | −727 |
| 8 | 6.45 | −971 |
| 9 | 7.04 | −1120 |

TABLE 5

| Thickness (mm) | Slope | Intercept |
|---|---|---|
| 3 | 0.39 | −60 |
| 4 | 0.92 | −142 |
| 5 | 1.7 | −263 |
| 6 | 2.71 | −419 |
| 7 | 3.95 | −612 |
| 8 | 4.39 | −739 |
| 9 | 5.68 | −963 |

TABLE 6

| Thickness (mm) | Slope | Intercept |
|---|---|---|
| 3 | 0.24 | −38.9 |
| 4 | 0.56 | −91.55 |
| 5 | 1.03 | −167.6 |
| 6 | 1.64 | −267.7 |
| 7 | 2.4 | −391.5 |
| 8 | 3.31 | −539.6 |
| 9 | 3.66 | −642 |

Further, the relationship between the thickness and the slope and the relationship between the thickness and the intercept were graphed, and an approximate straight line was determined by the least square method. From the obtained approximate straight line and the outer diameter, the following Expressions (1) to (3) relating to the residual stress at the depth position of 50 μm from the surface are obtained for each target roundness. In the Expressions, D is the outer diameter of the bearing ring, and t is the thickness of the bearing ring.

When the target roundness is within the maximum value of JIS Grade 0, in the present invention, $$\text{residual stress} \geq (1.04 \times t - 2.2) \times D - 170.8 \times t + 425 \quad (1)$$

When the target roundness is within 0.015% of the outer diameter, in the present invention, $$\text{residual stress} \geq (0.90 \times t - 2.6) \times D - 151.9 \times t + 454 \quad (2)$$

When the target roundness is within 0.01% of the outer diameter, in the present invention, $$\text{residual stress} \geq (0.61 \times t - 1.8) \times D - 104.6 \times t + 322 \quad (3)$$

For example, in the case of an outer ring of a tapered roller bearing having an outer diameter of 73 mm and an effective thickness of 4.8 mm, in order to keep the roundness after polishing within the maximum value of JIS Grade 0, from Expression (1), the average residual stress at the depth position of 50 μm to 250 μm on a raceway surface of the intermediate member of the bearing ring serving as the outer ring may be about −191 MPa or higher. When the roundness is further increased, the residual stress may be set to −150 MPa or higher in order to make the roundness within 0.015% of the outer diameter from Expression (2); the residual stress may be set to −97 MPa or higher in order to make the roundness within 0.01% of the outer diameter from Expression (3).

In the surface hardening treatment by carburizing, nitriding, or carbonitriding, the residual stress on the surface is basically compressive, and the residual stress becomes a negative value.

Then, by polishing the bearing ring intermediate member whose residual stress is controlled so as to satisfy the expressions (1) to (3) in this way, even if some elliptical deformation occurs, it is possible to reduce the occurrence of stress resulting from non-uniform stock allowance, and to ensure the target roundness in the bearing ring.

As described above, since the surface property of the bearing ring intermediate member is reflected in the surface property of the obtained bearing ring, for example, assuming that the average residual stress value of the bearing ring intermediate member which is subjected to heat treatment so as to satisfy Expression (1) is −150 MPa, the residual stress on the surface of the bearing ring is lower than −150 MPa. When the residual stress value of the bearing ring is evaluated, it is necessary to remove the residual stress caused by the polishing processing. To achieve this, electrolytic polishing of about 50 μm is necessary, and the surface residual stress of the bearing ring after polishing is a residual stress at a depth of 50 μm.

EXAMPLES

The present invention is further specifically described below with reference to Examples, but the present invention is not limited to such Examples in any way.

(Preliminary Test)

A steel material containing 0.4% by mass of carbon and further added with an alloy element such as Cr or Mn in order to ensure hardenability in oil cooling was prepared. An annular member whose outer diameter is about 75 mm was cut out from this steel material, and was subjected to carbonitriding treatment for 3.5 hours. Next, after secondary heating, quenching is performed in oil of about 100° C., and water is quickly sprayed to perform cleaning and quenching, the surface temperature of the annular member was set to 20 to 50° C., and tempering was performed to obtain a test piece. Then, the circumferential surface of the test piece was electrolytically polished to a predetermined depth, and an operation of measuring a residual stress at that position was repeated, and the residual stress up to a depth of 250 μm in the vicinity of stock allowance was obtained. As results of the measurement, an average residual stress up to a depth of 250 μm was −37 MPa when a surface temperature was 20° C., −34 Mpa when the surface temperature was 30° C., and −138 Mpa when the surface temperature was 50° C.

Figure 2:
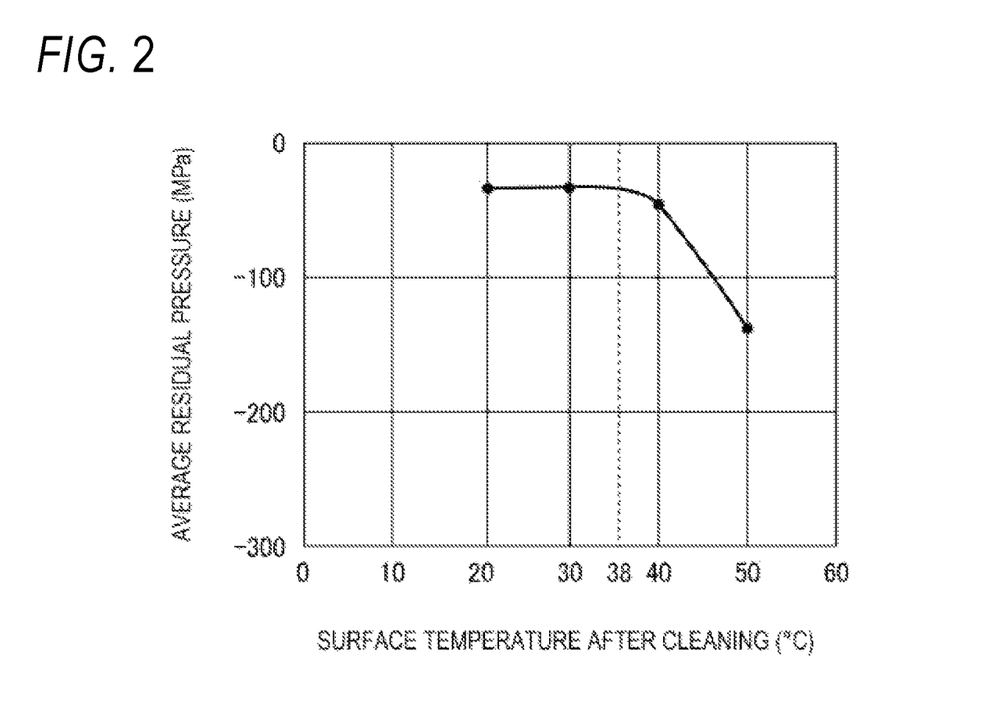
FIG. 2 is a graph showing results of a preliminary test, and shows a relationship between a surface temperature of an annular member and a residual stress.

The measurement results are graphed and shown in FIG. 2, and the average residual stress is constant at a small value when the surface temperature of the annular member is 40° C. or lower, and constant at a smaller value when the surface temperature of the annular member is 38° C. or lower. That is, it is understood that the surface temperature of the annular member may be 40° C. or lower, preferably 38° C. or lower by rapid cooling.

Example 1, Example 2, Comparative Example 1

Similar to the preliminary test, an annular member for an outer ring of the tapered roller bearing having an outer diameter of 73 mm and a thickness of 4.8 mm was cut out from the steel material containing 0.4% by mass of carbon and added with an alloy element such as Cr or Mn, and was subjected to the carbonitriding treatment for 3.5 hours. Next, after secondary heating, quenching was performed in oil of about 100° C., the annular member was rapidly cooled to 50° C. after the quenching in Example 1 while the annular member was rapidly cooled to room tempering (25° C.) after the quenching in Example 2, and then the tempering was performed at 180° C. to obtain a test piece. On the other hand, in Comparative Example 1, after the quenching, the annular member was not particularly cooled, and then the tempering was performed at 180° C. to obtain a test piece.

For some parts of these test pieces, a circumferential surface corresponding to the raceway surface was electrolytically polished to a predetermined depth, and an operation of measuring the residual stress at that position was repeated to determine a residual stress distribution in the depth direction. However, the maximum measurement depth was 250 which was the stock allowance for grinding the workpiece. Table 7 shows values of the residual stress of each test piece.

TABLE 7

| Depth (mm) | Comparative Example 1 (MPa) | Example 1 (MPa) | Example 2 (MPa) |
| --- | --- | --- | --- |
| 0.05 | −330 | −90 | −59 |
| 0.1 | −289 | −135 | −62 |
| 0.15 | −235 | −106 | −11 |
| 0.2 | −263 | −114 | −5 |
| 0.25 | −266 | −108 | −8 |
| average value | −277 | −111 | −29 |

Figure 3:
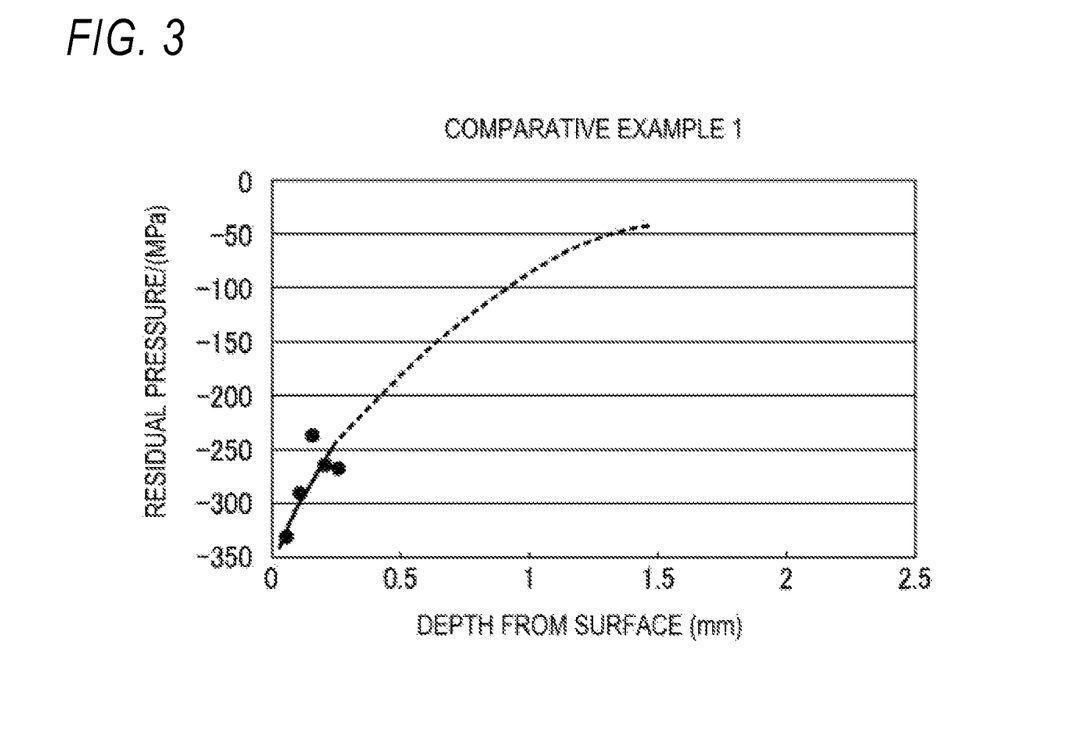
FIG. 3 is a graph showing a distribution of residual stress in a depth direction in Comparative Example 1.
Figure 4:
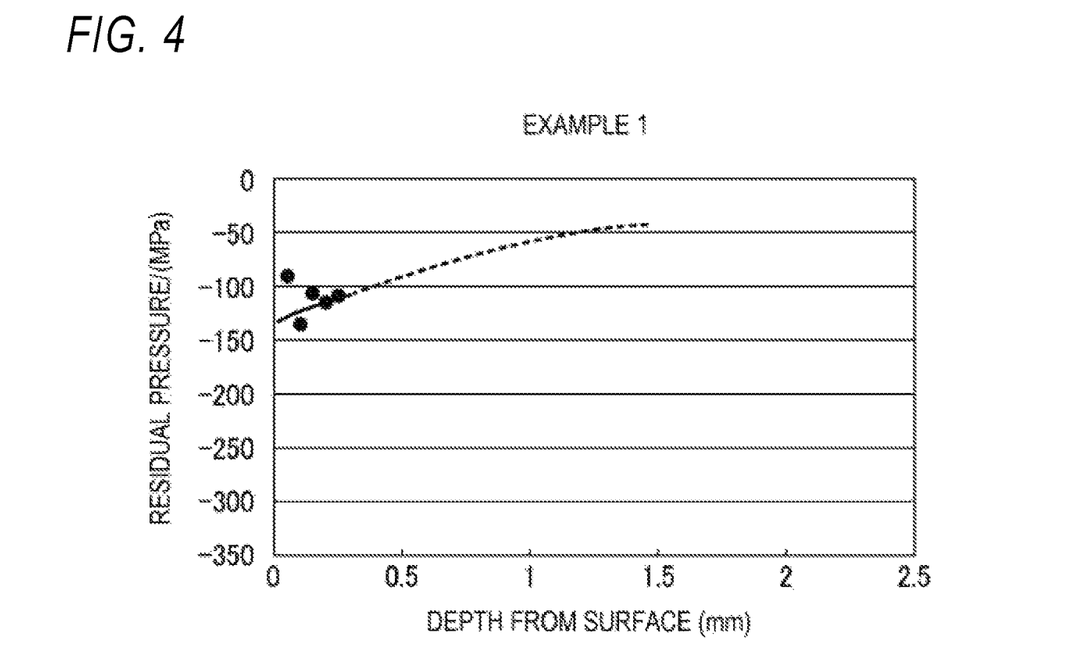
FIG. 4 is a graph showing a distribution of residual stress in the depth direction in Example 1.
Figure 5:
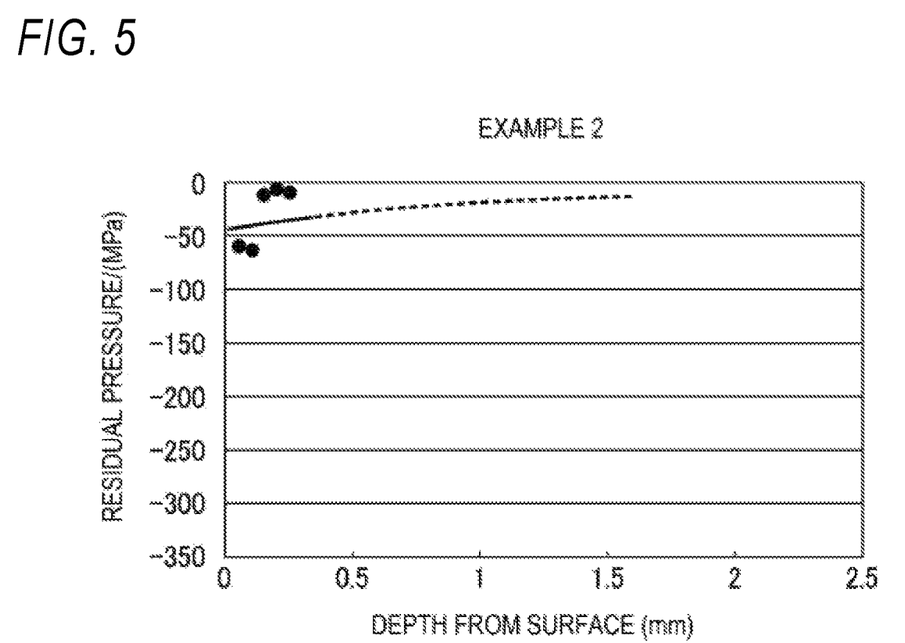
FIG. 5 is a graph showing a distribution of residual stress in the depth direction in Example 2.

FIGS. 3 to 5 are graphs showing the residual stress distribution in the depth direction of each test piece using the results of Table 7. As mentioned above, since the residual stress of the core portion is estimated to be almost zero, while the residual stress clearly decreases toward the core portion in Comparative Example 1, since the residual stress value at a depth of 50 to 250 μm in the stock allowance is kept low in Examples 1 and 2, it can be seen that the residual stress gently decreases toward the core portion.

Subsequently, the change in roundness due to grinding in each case was evaluated.

Figure 6A:
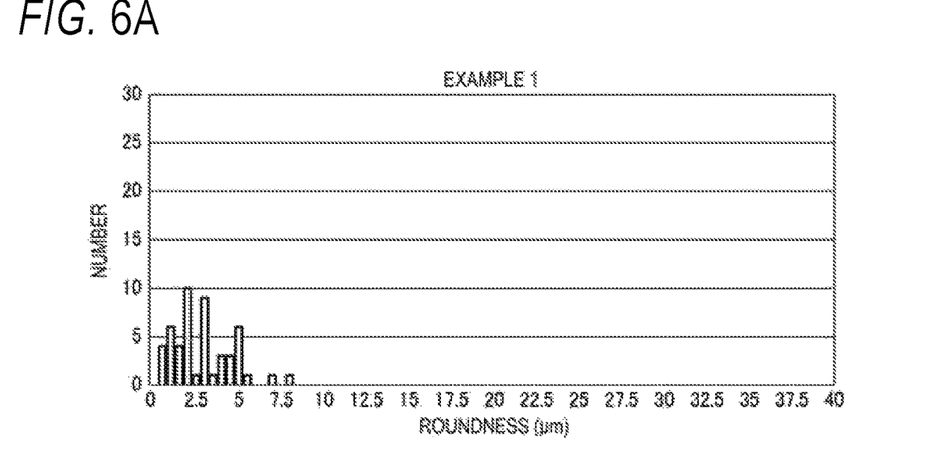
FIGS. 6A, 6B and 6C are graphs each showing a roundness distribution of a polished specimen obtained in Example 1, Example 2, and Comparative Example 1.
Figure 6B:
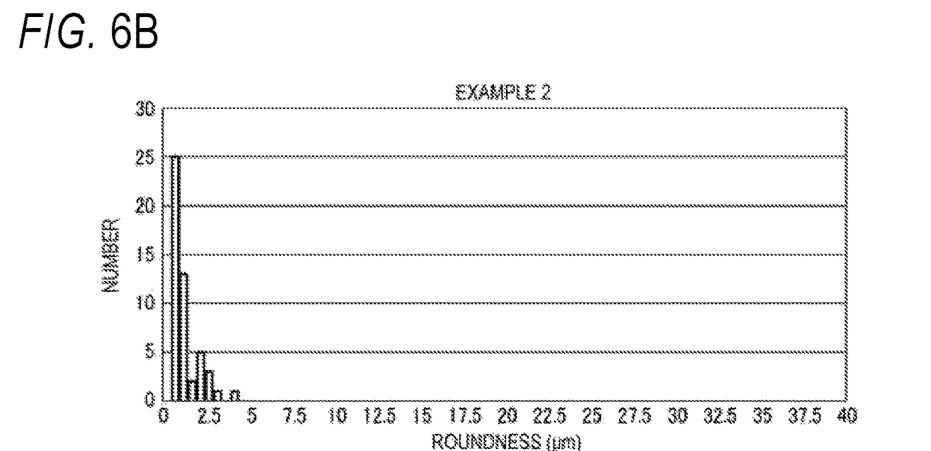
Figure 6C:
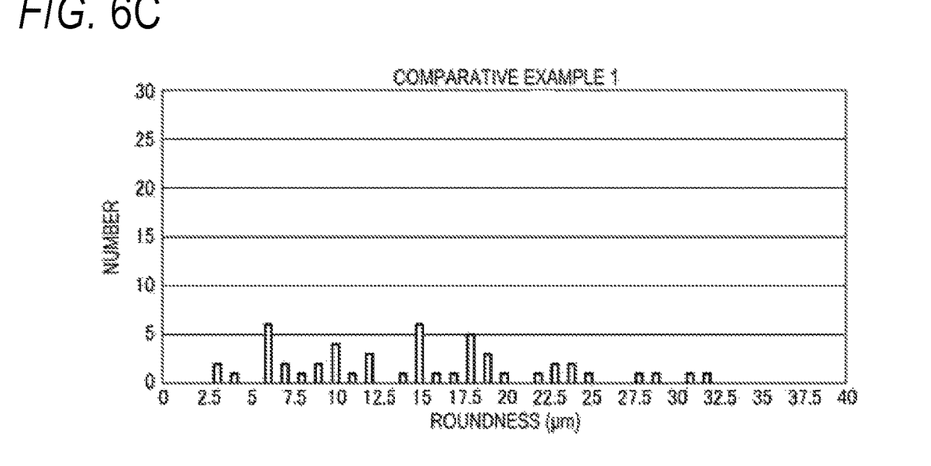

The roundness of each test piece after the heat treatment was almost the same. For 50 test pieces in each case, the outer diameter side and the inner diameter side were polished once each, and the roundness was measured. The results are shown in FIGS. 6A to 6C. In Comparative Example 1, the roundness is 3 to 32 μm, and there is a large variation. In contrast, in Example 1, the roundness of all the test pieces is 8 μm or less; in Example 2, the roundness of all the test pieces is 4 μm or less, and the roundness is smaller and uniform.

In the outer ring of a tapered roller bearing having the outer diameter of 73 mm and the effective thickness of 4.8 mm, the residual stress may be set to −191 MPa or more in order to keep the roundness within the maximum value of JIS Grade 0 according to Expression (1), the residual stress may be set to −150 MPa or more in order to keep the roundness within 0.015% of the outer diameter according to Expression (2), and the residual stress may be set to −97 MPa or more in order to keep the roundness within 0.01% of the outer diameter according to Expression (3). In Example 1, the average residual stress is −111 MPa, and the above-described residual stress (−150 Mpa or more) for suppressing the roundness within 0.015% (=11 μm) of the outer diameter is satisfied, and the roundness is 8 μm or less and also satisfies within 11 μm. Similarly, in Example 2, the average residual stress is −29 MPa, and the above-described residual stress (−97 Mpa or more) for suppressing the roundness within 0.01% (=7.3 μm) of the outer diameter is satisfied, and the roundness is 4 μm or less and also satisfies within 7.3 μm. In contrast, in Comparative Example 1, since the average residual stress is −277 MPa, the residual stress (−191 MPa or more) for keeping the roundness within the maximum value of JIS Grade 0 is not satisfied, and the maximum of roundness is 32 μm and does not satisfy the roundness of JIS Grade 0.

Thus, it can be seen from Comparative Example 1, Example 1, and Example 2 that the target roundness and Expressions (1) to (3) have a correlation.

Although the invention has been described in detail with reference to the specific embodiments, it will be apparent to those skilled in the art that various changes and modifications can be made without departing from the spirit and scope of the invention.

This application is based on Japanese Patent Application (No. 2018-070943) filed on Apr. 2, 2018 and Japanese Patent Application (No. 2018-077598) filed on Apr. 13, 2018, contents of which are incorporated herein by reference.

INDUSTRIAL APPLICABILITY

According to the present invention, in various rolling bearings, a bearing ring having a high roundness can be obtained, and a highly accurate rolling bearing can be obtained. For example, the rolling bearings are useful as rolling bearings used in an automobile transmission, a computer tomography machine (CT scanner) or the like.

REFERENCE SIGNS LIST 1 housing
2 input shaft
3 output shaft
4 pilot shaft
5 counter shaft
6 reverse shaft
7 cylindrical roller bearing
8 needle roller bearing
9 gear group
9a, 9b gear
10 gear member
11 clutch hub

The invention claimed is:

1. A method for manufacturing a bearing ring of a rolling bearing, the method comprising a series of steps of:
   cutting out a ring member from a material;
   forming a surface-hardened layer on the ring member;
   quenching and tempering the ring member; and
   polishing an inner diameter surface and an outer diameter surface of the ring member, wherein
   the method comprises:
   after the quenching and before the tempering, rapidly cooling the ring member such that the ring member has a surface temperature of 50° C. or lower to form a bearing ring intermediate member; and
   after the tempering, polishing an inner diameter surface and an outer diameter surface of the bearing ring intermediate member.

2. The method for manufacturing the bearing ring of the rolling bearing according to claim 1, wherein
   the rapid cooling is performed along with cleaning of the ring member with a cleaning liquid after the quenching and before the tempering.

3. The method for manufacturing the bearing ring of the rolling bearing according to claim 1, wherein
   an absolute value of an average residual stress of each part from a surface to a core portion of the bearing ring in a radial direction is 0 to 191 MPa.

* * * * *